(12) United States Patent
Dubugnon et al.

(10) Patent No.: US 11,375,828 B2
(45) Date of Patent: Jul. 5, 2022

(54) DISPLAY DEVICE FOR A DECORATIVE OBJECT

(71) Applicant: The Swatch Group Research and Development Ltd, Marin (CH)

(72) Inventors: Dominique Dubugnon, Saint-Prex (CH); Cédric Blatter, Commugny (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/343,161

(22) Filed: Jun. 9, 2021

(65) Prior Publication Data

US 2022/0022667 A1    Jan. 27, 2022

(30) Foreign Application Priority Data

Jul. 21, 2020   (EP) ..................................... 20186983

(51) Int. Cl.
| | |
|---|---|
| *A47F 11/10* | (2006.01) |
| *A47F 3/00* | (2006.01) |
| *F21V 33/00* | (2006.01) |
| *F21V 23/04* | (2006.01) |
| *H05B 47/125* | (2020.01) |
| *F21W 131/401* | (2006.01) |

(52) U.S. Cl.
CPC .............. *A47F 11/10* (2013.01); *A47F 3/001* (2013.01); *F21V 23/0478* (2013.01); *F21V 33/0012* (2013.01); *H05B 47/125* (2020.01); *F21W 2131/401* (2013.01)

(58) Field of Classification Search
CPC ........ A47F 11/10; A47F 3/001; F21V 33/012; F21V 23/0478; H05B 47/125
See application file for complete search history.

(56) References Cited

U.S. PATENT DOCUMENTS

| | | |
|---|---|---|
| 2011/0141011 A1 | 6/2011 | Lashina et al. |
| 2016/0295672 A1 | 10/2016 | Murdoch et al. |
| 2018/0317290 A1 | 11/2018 | Baaijens et al. |

FOREIGN PATENT DOCUMENTS

WO    2016/046042 A1    3/2016

OTHER PUBLICATIONS

European Search Report of European Application No. 20 18 6983 dated Dec. 7, 2020.

*Primary Examiner* — Thomas M Sember
(74) *Attorney, Agent, or Firm* — Sughrue Mion, PLLC

(57) ABSTRACT

A display device (1) for displaying a decorative object (2), including a case (4) provided with a support element (5) on which an area of interest (3) is defined, inside which the decorative object (2) is likely to be disposed and/or handled. A processing unit generates a command for controlling the illumination properties of a main illumination device (8*a*) and/or of a secondary illumination device (8*b*) as a function of criteria concerning the viewer's visual perception of the object (3) and controls the main illumination device (8*a*) and/or the secondary illumination device (8*b*) as a function of the command for controlling the properties of the illumination devices (8*a*, 8*b*).

11 Claims, 1 Drawing Sheet

DISPLAY DEVICE FOR A DECORATIVE OBJECT

CROSS REFERENCE TO RELATED APPLICATIONS

This application claims priority to European Patent Application No. 20186983.1, filed on Jul. 21, 2020, the entire contents of which are incorporated herein by reference.

TECHNICAL FIELD

The invention relates to a display device for a decorative object.

TECHNOLOGICAL BACKGROUND

In the prior art, objects such as timepieces, in particular those comprising precious materials or precious stones, are conventionally displayed for sale in display devices equipped with lamps intended to illuminate such objects in order to make them visible to people located in the vicinity of these devices.

However, one of the major drawbacks of such devices is that they do not sufficiently showcase these objects due to lamps and, more generally, illumination systems that are often unsuitable.

It is thus understood that there is a need for a solution that helps to achieve optimised illumination of these decorative objects.

SUMMARY OF THE INVENTION

One purpose of the invention is thus to propose a solution that makes it possible to improve the illumination of decorative objects in order to better showcase them, in particular by means of dynamic, adaptive and automatic control of this illumination.

The invention relates to a display device for displaying a decorative object, comprising a case provided with a support element on which an area of interest is defined, inside which said decorative object is likely to be disposed and/or handled, the display device including:
  devices for identifying the viewer and the decorative object;
  a system for illuminating the area of interest comprising a main illumination device and a secondary illumination device provided with light-emitting elements which are configured to illuminate this area of interest as a function of the viewer's viewing profile and/or as a function of a behavioural state of the viewer and/or as a function of the features of the object;
  a processing unit configured for:
    generating a command for controlling the illumination properties of the main illumination device and/or of the secondary illumination device as a function of criteria concerning the viewer's visual perception of the object;
    controlling the main illumination device and/or the secondary illumination device as a function of said command for controlling the properties of these illumination devices.

In other embodiments:
the identification device comprises a module for authenticating the viewer and a module for identifying a behavioural state of this viewer;
the case comprises a base and a ceiling, in addition to side, rear and front faces delimiting, together with this base and this ceiling, an internal volume inside which the area of interest is defined, said case having an area for viewing the object from the outside that is entirely or partly included in the front face;
the processing unit is connected to the viewer and decorative object identification devices;
the processing unit is connected to a database comprising viewing profile data for the viewer, viewing profile data relating to the viewer's behavioural state, data on the features of the decorative objects and viewer and/or object identification data;
the main illumination device comprises a first illumination module, a second illumination module and/or a third illumination module, each provided with a plurality of light-emitting elements;
the main illumination device comprises a first illumination module, a second illumination module and/or a third illumination module, each provided with a single light-emitting element which is coupled to a modulator;
the first illumination module is arranged above the area of interest and thus above the plate of the support element;
the second illumination module is disposed below the area of interest and thus below the plate of the support element;
the third illumination module is arranged in the periphery of the area of interest and thus of the plate of the support element;
the main illumination device comprises an adjustment element entirely or partly arranged around the area of interest and extending vertically between the base and the ceiling of the case;
the adjustment element, which is controlled by the processing unit, can switch between a state of reflectance of light radiation originating from the first, second or third illumination module towards the area of interest, and a state of scattering of light radiation originating from the secondary illumination device towards the area of interest;
the display device comprises a device for monitoring the head of the viewer contemplating the decorative object and a device for measuring the luminance perceptible to the eye of this viewer;
the secondary illumination device is arranged outside the case, in particular above this case, and
the decorative object is a piece of jewellery or a timepiece.

BRIEF DESCRIPTION OF THE FIGURES

The invention will be described in more detail hereafter using the accompanying figures, given by way of examples that are in no way limiting, wherein.

DETAILED DESCRIPTION OF THE INVENTION

Figure 1:
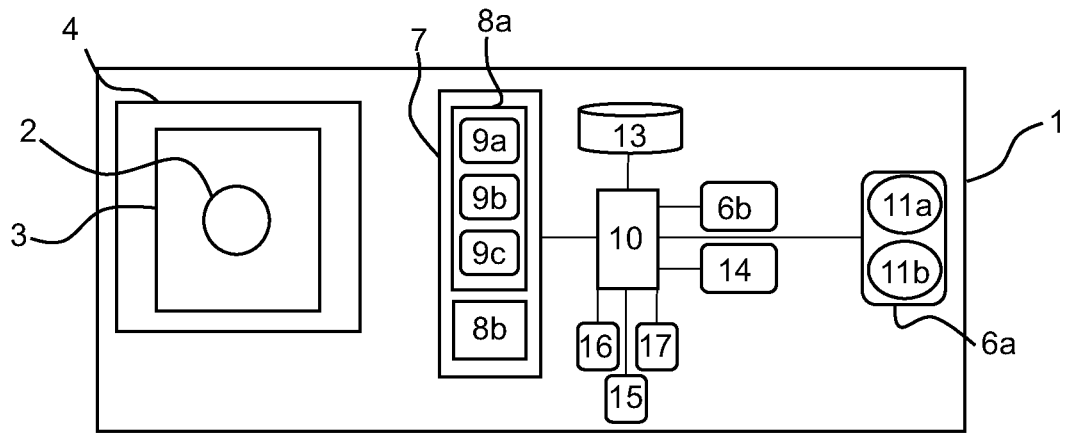
FIG. 1 is a diagrammatic view of a display device for a decorative object, according to one embodiment of the invention.

FIG. 1 shows a display device 1 for displaying a decorative object 2, comprising an exhibition case 4 provided with a support element 5 on which an area of interest 3 is defined, inside which said decorative object 2 is likely to be disposed. In a non-limiting and non-exhaustive manner, this decorative object 2 can be a timepiece, a piece of jewellery or a precious stone.

The purpose of such a display device 1 is to offer a person viewing or handling the decorative object 2 comprised inside the area of interest 3, a visual perception of this object 3 which is adapted or even tailored thereto. This visual perception can be defined as being the result of the interpretation of at least one piece of information about this object by the brain of this person. This information is contained in light radiation that is captured by photoreception and enters through the pupils of this person so as to activate the receptive cells thereof, which are located in the retinas of the person's eyes. The signals produced by these cells are then transmitted via the optic nerve to the brain. In the description hereinbelow of the invention, this person viewing or handling this decorative object 2 in the area of interest 3 will be referred to as a "viewer".

Figure 2:
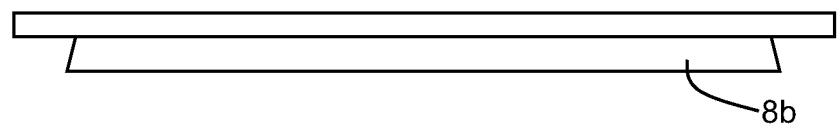
FIG. 2 is an illustration of an exhibition case of this display device inside which the decorative object is disposed, according to the embodiment of the invention.
Figure 2:
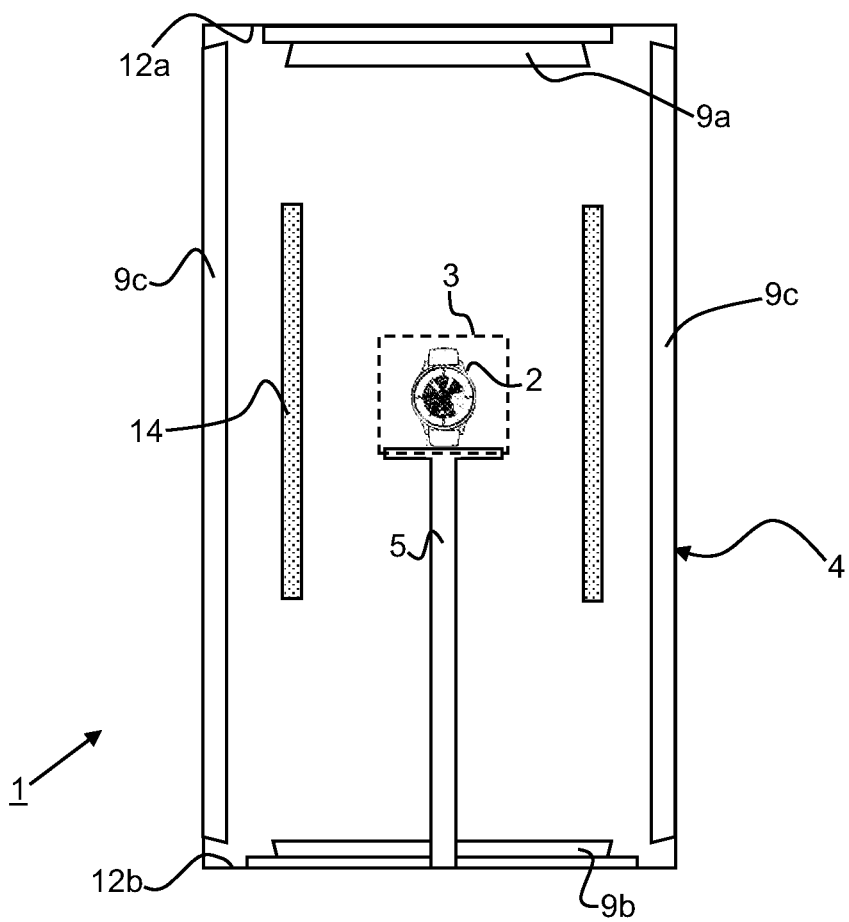

In this display device 1, the case 4 visible in FIG. 2 can also be referred to as a "display case" or "display box". This case 4 comprises a base 12*a* and a ceiling 12*b*, as well as side, rear and front faces which are glazed. The front face is transparent and the side and rear faces can also be transparent or translucent. According to an alternative embodiment, the base 12*a* and the ceiling 12*b* of this case 4 can also be glazed and transparent or translucent. Together with the base 12*a* and the ceiling 12*b*, all of these faces delimit an internal volume of the case 4 which includes the area of interest 3 inside which the decorative object 2 is placed. This area of interest 3 is comprised on all or part of a plate of the support element 5. This support element 5 further comprises at least one element for fastening this plate inside the case 4. Said at least one fastening element is preferably connected to the base 12*a* of this case 4, thus forming a leg of the support element 5. According to alternative embodiments, said at least one fastening element can be connected to the base 12*a* and/or to the ceiling 12*b* and/or to one or more side faces and/or to the rear face. It should be noted that the plate and said at least one fastening element can be transparent or translucent. Moreover, the case 4 comprises an area for viewing the object from the outside. This area is defined in whole or in part within the front face of this case 4. This viewing area can be an opening made in this front face or a transparent part of this front face. In the case of an opening, the latter can optionally be provided with a polarised filter capable of spectral, spatial and temporal modulation. Finally, it should be noted that the case 4 has a cross-section parallel to the ceiling 12*a* and/or to the base 12*b* that is polygonal in shape.

The display device 1 further comprises a processing unit 10 which in particular contributes to controlling/managing the illumination of the area of interest 3 as a function of the viewer identified and/or of the behavioural state thereof and/or of the features of the object 3 as will be seen hereinbelow. This processing unit 10, which can be a computer, comprises hardware and software resources, in particular at least one processor cooperating with memory elements. This processing unit 10 is capable of executing commands to implement a computer program in order to manage the illumination of the area of interest 3. Such a processing unit 10 is connected to other elements of the display device 1 such as identification devices 6*a*, 6*b* of the viewer and the decorative object 2, a device 15 for monitoring the viewer's head, a device 16 for measuring the luminance relative to a part of a surface of the decorative object 2, a database 13 and a system 7 for illuminating said area of interest 3.

The viewer identification device 6*a* comprises a module 11*a* for authenticating the viewer and a module 11*b* for identifying a behavioural state of this viewer. The viewer authentication module 11*a* is configured to contribute to the implementation of an identification or authentication of this viewer based on technologies that are well known in the prior art, relating to biometric authentication or radio authentication, and based on the viewer identification data stored in the database 13. Such a module 11*a* is implemented by the identification device 6*a* when the viewer is known to the display device 1 and the identification/authentication data thereof are thus already present in the database 13. The module 11*b* for identifying a behavioural state of the viewer is implemented when the viewer is not known to the display device 1 or in addition to the authentication of this viewer by the authentication module 11*a*. This module 11*b* for identifying a behavioural state of the viewer comprises systems for capturing at least one image and at least one sound element relating to the viewer associated with algorithms for digitally processing images and sound elements. Thus, such a module 11*b* can, for example, be used to identify an agitated behavioural state or conversely a calm behavioural state of the viewer based on the capture of the body movements and voice of this viewer for example. In this context, the capture of the viewer's arm movements, the frequency and amplitude whereof are high, coupled with a high voice tone can reflect a rather agitated behavioural state. This module 11*b* for identifying a behavioural state is also capable of assessing, in a non-limiting and non-exhaustive manner, the age, gender, temperature and respiratory rate of this viewer. This identification of the behavioural state of the viewer is taken into account by the display device 1 in order to define an appropriate illumination of the area of interest.

As described hereinabove, the display device 1 further comprises a device 6*b* for identifying the decorative object 2. This device 6*b* for identifying the decorative object 2 implements systems for capturing at least one image, associated with digital image processing algorithms. Such a device contributes to identifying the objects from the object identification data stored in the database 13. These object identification data include, in a non-exhaustive and non-limiting manner: two-dimensional or three-dimensional display data for these objects describing, in particular, the shape, dimensions and/or aesthetic appearance of each object, as well as data relating to the nature of the material from which this object is made. These data can also comprise information data of the two-dimensional or three-dimensional bar code or serial number type that can be present on the object.

In this configuration, it is thus understood that the processing unit 10 and the devices 6*a*, 6*b* for identifying the viewer and the decorative object 2, as well as the database 13 jointly contribute to authenticating the viewer and/or the decorative object 2 and/or a behavioural state of this viewer in order to generate an illumination of the area of interest 3 that is specific to this viewer.

More specifically, the configuration of an illumination of the area of interest 3 is carried out as a function of a viewing profile of the identified/authenticated viewer and/or of at least one feature of the identified object and/or of the behavioural profile of this viewer. This configuration of the illumination is carried out by the processing unit 10 which controls the illumination system 7. Such a system 7 comprises a main illumination device 8a and a secondary illumination device 8b, as well as an element 14 for adjusting the illumination of the area of interest 3. This main illumination device 8a is comprised inside the case 4, whereas the secondary illumination device 8b is arranged outside this case 4. Each of these main and secondary illumination devices 8a, 8b is provided with a plurality of light-emitting elements. Alternatively, each illumination device 8a, 8b can comprise a single light-emitting element that is coupled to a modulator. In this context, this modulator is capable of modifying the light spectrum of this diode, as well as the intensity/amplitude, the orientation and/or the degree of directivity and/or the scattering of the light radiation of this diode. A light-emitting element comprises a light-emitting diode and further comprises, according to an alternative embodiment, a microlens or other optical means. It should be noted that, in an alternative embodiment, a light-emitting element can be devoid of such a diode.

The main illumination device 8a includes three illumination modules 9a to 9c. The secondary illumination device 8b comprises an illumination module arranged above the case 4. This illumination module is disposed at a height measured from the ground that is greater than that of the three illumination modules of the main illumination device 8a. This single illumination module of the secondary illumination device 8b emits light radiation which encompasses the case 4 and the peripheral area thereof. Such an illumination module preferably generates a homogeneous illumination in the environment of this case 4.

In the main illumination device 8a, the first illumination module 9a is arranged above the area of interest 3 and thus above the plate of the support element 5. More specifically, this first module 9a is disposed on all or part of the ceiling 12b of the case 4. The illumination device 8a further comprises a second illumination module 9b disposed below the area of interest 3 and thus below the plate of the support element 5. In particular, this second illumination module 9b is arranged in whole or in part on the base 12a of the case 4. Finally, this illumination device 8a comprises a third illumination module 9c arranged in the periphery of the area of interest 3 and thus of the plate of the support element 5. Indeed, this third module is disposed in all or part of the corners of the case 4. Each corner of the case 4 is comprised within a salient angle of the case 4, formed by the intersection between the faces thereof. These corners extend vertically between the base 12a and the ceiling 12b of this case 4. In other words, the direction in which each of these corners extends is substantially perpendicular or is perpendicular to a plane comprising the ceiling 12b or the base 12a.

According to an alternative embodiment, the main illumination device 8a comprises only the first and second illumination modules 9a, 9b together with the element 14 for adjusting the illumination of the area of interest 3, which will be described hereinbelow.

According to another alternative embodiment, the main illumination device 8a comprises only the third illumination module 9c together with the adjustment element 14. It is understood that in the latter alternative embodiment, the base 12a and the ceiling 12b are each preferably transparent or translucent.

This adjustment element 14, which is connected to the processing unit 10, is entirely or partly arranged around the area of interest 3 and extends vertically between the base 12a and the ceiling 12b of the case 4. Such an adjustment element 14 comprises an opening through which the area of interest 3, and more particularly the decorative object 2, can be seen or even handled by the viewer. This adjustment element 14, which is controlled by the processing unit 10, can switch between the following states:
- a state of reflectance of light radiation originating from the first, second or third illumination module 9a to 9c towards the area of interest 3, and
- a state of scattering of light radiation originating from the third illumination module 9c and/or from the secondary illumination device 8b towards the area of interest 3.

This adjustment element 14 can be a panel disposed inside the case 4 between the area of interest 3 and essentially the side and rear faces. According to an alternative embodiment, this adjustment element 14 can be applied to the inner and/or outer surfaces of these side and rear faces in a coating-like manner. According to an alternative embodiment, this adjustment element 14 can be directly comprised within the thickness of these side and rear faces. It should be noted that, in these two alternative embodiments, the control element 14 can be operated using technologies of the electrochromic, photochromic, thermochromic or liquid crystal type.

When the viewer is already known to the display device 1 and is thus authenticated, the illumination will then be configured by the processing unit 10 which is connected to the illumination system 7 and to the database 13. This configuration is thus carried out on the basis of visual perception criteria assessed from data contained in the database 13 and which relate to:
- the viewing profile of the authenticated viewer, and/or
- features of the identified decorative object 2 such as physical, chemical, aesthetic, functional and structural features, and/or
- the viewing profile relative to the identified behavioural state of this viewer.

The viewing profile data for the viewer comprise physiological and biological data that affect visual perception. It should be noted that these physiological and biological data can relate to:
- age;
- the viewer's gender;
- features of the viewer's ocular system (sensitivity to glare);
- features of the viewer's nervous system;
- features concerning the visual resistance and/or endurance of this viewer.

The viewing profile data relating to the identified behavioural state of the viewer comprise physical and psychological data affecting visual perception. These data in particular relate to:
- age;
- the viewer's gender;
- a digital model of the viewing profile relating to the identified behavioural state, such a model having been generated by an algorithm, in particular a learning algorithm, on the basis of the behavioural characteristics of the viewer.

With regard to the viewing profile data for the viewer and the viewing profile for the viewer's identified behavioural state, it should be noted that the following contextual elements should also be taken into account:
- the time of day, for example, in order to take into account the viewer's circadian rhythm;
- the date and year in which the viewer is viewing or handling the decorative object 2;
- the geographical position of the display device 1 and thus the location of this display device 1;
- the spectrum and intensity of the daylight in the event that the case 4 is disposed in such light, and visual photobiological safety features comprising, for example, standards/safety features related to a visual exposure time linked to a light wavelength.

When the viewer is not known to the display device 1, the illumination will thus be configured by the processing unit 10 connected to the illumination system 7, on the basis of visual perception criteria assessed from data contained in the database 13 relating to:
- the viewing profile relative to the identified behavioural state of this viewer, which has been described in detail hereinabove, and/or
- features of the identified decorative object 2 also mentioned hereinabove.

In this context, the processing unit 10 is thus capable of generating a command for controlling illumination properties of the main illumination device 8a and/or of the secondary illumination device 8b as a function of the criteria concerning the viewer's visual perception. It should be noted that these visual perception criteria are intended to characterise/quantify an optimal visual perception of the known or unknown viewer of the display device 1, as a function of viewing profile data for the identified viewer and of viewing profile data for the identified behavioural state thereof, and as a function of data on the features of the identified decorative object.

The illumination properties of the main and secondary illumination devices 8a, 8b mentioned hereinabove comprise:
- the light spectrum of each light-emitting diode making up each of these illumination devices 8a, 8b;
- the intensity/amplitude of the light radiation of each light-emitting diode making up each of these illumination devices 8a, 8b;
- the orientation and/or the degree of directivity and/or the scattering of the light radiation produced by all of the light-emitting diodes making up each of these illumination devices 8a, 8b, such as an integrating sphere for example.

The processing unit 10, after having generated the commands for controlling the illumination properties of the main illumination device 8a and/or of the secondary illumination device 8b, will then execute them. This execution will thus allow the processing unit 10 to affect:
- the light spectrum and/or the intensity/amplitude of the light radiation of all or part of the light-emitting diodes of the main illumination device 8a and/or of the secondary illumination device 8b;
- the orientation and/or the degree of directivity and/or the scattering of the light radiation originating from the main illumination device 8a and/or from the secondary illumination device 8b, for example from:
  - the selective switching off or switching on of light-emitting diodes of the main illumination device 8a and/or of the secondary illumination device 8b, or
  - the orientation of the light radiation of the main device and/or of the secondary illumination device 8b, each of the diodes whereof is provided, for example, with a microlens or other optical means.

As mentioned hereinabove, the display device 1 comprises a device 15 for monitoring the viewer's head, as well as a device 16 for measuring the luminance relative to a part of a surface of the decorative object 2, both of which are connected to the processing unit 10. This monitoring device 15 comprises systems for capturing at least one image, associated with digital image processing algorithms and an eye-tracker or pupillometer. Such a monitoring device 15 is capable of:
- determining movements and positions of the viewer's head relative to the rest of his/her body;
- interpreting specific facial expressions of the viewer;
- identifying changes in the viewer's facial expression;
- measuring and recording the viewers eye paths by determining, for example, the direction or orientation of the viewers gaze relative to the object.

Such a monitoring device 15 in particular contributes to re-assessing the viewers perception criteria of the decorative object 2 with a view to modifying the illumination of the area of interest 3 on the basis of the re-assessed visual perception criteria. In particular, by being connected to such a monitoring device 15, the processing unit 10 is, for example, able to identify a state of fatigue and/or visual discomfort of the viewer which is likely to alter his/her visual perception of the decorative object 2. Such a state of fatigue and/or visual discomfort can, for example, lead to or be the cause of a loss of attention or a lack or loss of concentration by this viewer. In this context, a state of fatigue of the viewer or a visual discomfort can be caused by inappropriate illumination of the area of interest 3 and more particularly of the object 3. In such a context, the processing unit 10 processes the data it receives from the following devices:
- the device 15 for monitoring the viewers head;
- the device 16 for measuring the luminance resulting from a part of a surface of the object on which the viewer's gaze is focused or resting;
- the device 17 for measuring physiological and/or biological parameters of the viewer.

In this configuration, the monitoring device 15 transmits data such as an image or a sequence of images or a video of the viewer's face, on the basis of which data the processing unit 10 carries out a digital processing operation enabling, for example, a specific expression on this face to be detected, such as a blink of an eyelid indicating a state of fatigue, or visual discomfort indicated by frowning. The luminance measuring device 16 is capable of transmitting luminance measurement data relating to the part of the surface of the object 3 on which the viewer's gaze is focused or resting to the processing unit 10, and determines, for example, as a function of a luminance reference value, whether the one or more measurements carried out reveal a visual discomfort of this viewer, caused by inappropriate illumination of the area of interest 3, and more particularly of this part of the surface of the decorative object 2. The device 17 for measuring physiological and/or biological parameters of the viewer transmits data measuring the physiological and/or biological state of the viewer to the processing unit 10.

In this context, the processing unit 10 is thus capable of generating re-assessed visual perception criteria as soon as a state of fatigue and/or a visual discomfort of the viewer is identified. For this purpose, this processing unit 10 implements computation operations with the aim of modifying the values of the visual perception criteria previously computed, based on a correction index characterising the level of fatigue and/or visual discomfort of the viewer. It should be noted that the processing unit 10 carries out such a re-assessment periodically according to:
- a predefined time interval that is configurable;
- a detection of a change in the direction/orientation of the viewers gaze relative to the decorative object 2;
- a detection of a handling of the decorative object 2;
- a detection of a displacement of the decorative object 2;
- a detection of a change in at least one optical property of the decorative object 2;

a detection of a viewing by the viewer of a new part of the surface of the decorative object 2;

a detection of a variation in at least one physiological and biological parameter of the viewer.

Thus, this processing unit 10 then controls the main illumination device 8a and/or the secondary illumination device 8b as a function of a new command for controlling the illumination properties resulting from the re-assessed visual perception criteria.

Optionally, the display device 1 can comprise loudspeakers connected to the processing unit 10 and which are capable of creating an ambient sound accompanying the illumination of the area of interest 3 comprising the decorative object 2 in particular as a function of the identified behavioural state of the viewer.

Moreover, the display device 1 can comprise a human-machine interface from which various so-called ambient visual and/or sound scenarios stored in the database 13 can be activated. Thus, the illumination properties of the main illumination device 8a and/or secondary illumination device 8b are controlled in a predefined sound environment, depending on the scenario selected.

The invention claimed is:

1. A display device (1) for displaying a decorative object (2), comprising a case (4) provided with a support element (5) on which an area of interest (3) is defined, inside which said decorative object (2) is likely to be disposed and/or handled, the display device (1) including:

devices (6a, 6b) for identifying a viewer and the decorative object (2);

a system (7) for illuminating the area of interest (3) comprising a main illumination device (8a) and a secondary illumination device (8b) provided with light-emitting elements which are configured to illuminate the area of interest (3) as a function of viewing profile data of the viewer, as a function of a behavioural state of the viewer, and as a function of the features of the object (3);

a processing unit (10) configured for:

generating a command for controlling the illumination properties of the main illumination device (8a) and/or of the secondary illumination device (8b) as a function of criteria concerning a visual perception by the viewer of the object (3) and the viewing profile data;

controlling the main illumination device (8a) and/or the secondary illumination device (8b) as a function of said command for controlling properties of these illumination devices (8a, 8b).

2. The display device (1) according to claim 1, wherein the identification device (6a) comprises a module (11a) for authenticating the viewer and a module (11b) for identifying a behavioural state of this viewer.

3. The display device (1) according claim 1, wherein the case (4) comprises a base (12a) and a ceiling (12b), in addition to side, rear and front faces delimiting, together with this base (12a) and the ceiling (12b), an internal volume inside which the area of interest (3) is defined, said case (4) having an area for viewing the object from outside the case that is entirely or partly included in the front face.

4. The display device (1) according to claim 1, wherein the processing unit (10) is connected to:

the devices (6a, 6b) for identifying the viewer and the decorative object (2), and a database (13) comprising viewing profile data for the viewer, viewing profile data relating to a behavioural state of the viewer, data on the features of the decorative objects and viewer and/or object identification data.

5. The display device (1) according to claim 1, wherein the main illumination device (8a) comprises a first illumination module (9a), a second illumination module (9b) and/or a third illumination module (9c), each provided with:

a plurality of light-emitting elements, or a single light-emitting element that is coupled to a modulator.

6. The display device (1) according to claim 1, wherein the main illumination device comprises:

a first illumination module (9a) is arranged above the area of interest (3) and thus above a plate of the support element (5);

a second illumination module (9b) is disposed below the area of interest (3) and thus below the plate of the support element (5); and a third illumination module (9c) is arranged in a periphery of the area of interest (3) and thus of the plate of the support element (5).

7. The display device (1) according to claim 1, wherein the secondary illumination device (8b) is arranged above the case (4).

8. The display device (1) according to claim 1, wherein the decorative object (2) is a piece of jewelry or a timepiece.

9. A display device (1) for displaying a decorative object (2), comprising a case (4) provided with a support element (5) on which an area of interest (3) is defined, inside which said decorative object (2) is likely to be disposed and/or handled, the display device (1) including:

devices (6a, 6b) for identifying a viewer and the decorative object (2);

a system (7) for illuminating the area of interest (3) comprising a main illumination device (8a) and a secondary illumination device (8b) provided with light-emitting elements which are configured to illuminate the area of interest (3) as a function of a viewing profile data of the viewer, and/or as a function of a behavioural state of the viewer, and/or as a function of the features of the object (3);

a processing unit (10) configured for:

generating a command for controlling the illumination properties of the main illumination device (8a) and/or of the secondary illumination device (8b) as a function of criteria concerning a visual perception by the viewer of the object (3); and controlling the main illumination device (8a) and/or the secondary illumination device (8b) as a function of said command for controlling the properties of these illumination devices (8a, 8b), wherein the main illumination device (8a) further comprises an adjustment element (14) entirely or partly arranged around the area of interest (3) and extending vertically between a base (12a) and a ceiling (12b) of the case (4).

10. The display device (1) according to claim 9, wherein the adjustment element (14), which is controlled by the processing unit (10), can switch between the following states:

a state of reflectance of light radiation originating from the first, second or third illumination module (9a, 9b, 9c) towards the area of interest (3), and a state of scattering of light radiation originating from the secondary illumination device (8b) towards the area of interest (3).

11. A display device (1) for displaying a decorative object (2), comprising a case (4) provided with a support element (5) on which an area of interest (3) is defined, inside which said decorative object (2) is likely to be disposed and/or handled, the display device (1) including:
- devices (6a, 6b) for identifying a viewer and the decorative object (2);
- a system (7) for illuminating the area of interest (3) comprising a main illumination device (8a) and a secondary illumination device (8b) provided with light-emitting elements which are configured to illuminate the area of interest (3) as a function of a viewing profile data of the viewer, and/or as a function of a behavioural state of the viewer, and/or as a function of the features of the object (3);
- a processing unit (10) configured for:
- generating a command for controlling the illumination properties of the main illumination device (8a) and/or of the secondary illumination device (8b) as a function of criteria concerning a visual perception by the viewer of the object (3); and
- controlling the main illumination device (8a) and/or the secondary illumination device (8b) as a function of said command for controlling the properties of these illumination devices (8a, 8b),
- further comprising a device (15) for monitoring a head of the viewer contemplating the decorative object (2) and a device (16) for measuring a luminance perceptible to an eye of the viewer.

* * * * *